(12) United States Patent
Soldatelli

(10) Patent No.: US 6,655,725 B2
(45) Date of Patent: Dec. 2, 2003

(54) CANOPY TOP FOR VEHICLES

(76) Inventor: Rubens Soldatelli, Rus Hermes Joeo Webber 122/Apt. 42, Caxias Do Sul RS-95010-400 (BR)

( * ) Notice: Subject to any disclaimer, the term of this patent is extended or adjusted under 35 U.S.C. 154(b) by 0 days.

(21) Appl. No.: 10/274,847

(22) Filed: Oct. 21, 2002

(65) Prior Publication Data

US 2003/0094832 A1 May 22, 2003

Related U.S. Application Data

(63) Continuation-in-part of application No. 29/129,035, filed on Sep. 6, 2000, now Pat. No. Des. 468,682, and a continuation-in-part of application No. 29/129,036, filed on Sep. 6, 2000, now Pat. No. Des. 464,606.

(30) Foreign Application Priority Data

Oct. 22, 2001 (BR) ......................................... 8102276 U

(51) Int. Cl.[7] .................................................. B60P 7/02
(52) U.S. Cl. ............................ 296/100.01; 296/100.18; 296/164
(58) Field of Search ....................... 296/100.01, 100.02, 296/100.17, 100.18, 102, 225, 156, 160, 164, 24.1; 135/88.01, 88.03

(56) References Cited

U.S. PATENT DOCUMENTS

| | | | | |
|---|---|---|---|---|
| 2,463,646 A | * | 3/1949 | Schassberger | 296/102 |
| 2,846,262 A | * | 5/1958 | Ray | 296/161 |
| 3,794,375 A | * | 2/1974 | Woodward | 296/36 |
| 3,930,680 A | * | 1/1976 | Littlefield | 296/10 |
| 4,813,734 A | * | 3/1989 | Hoover | 296/102 |
| 5,056,855 A | * | 10/1991 | Moravsky | 296/165 |
| 5,735,566 A | * | 4/1998 | Bradley | 296/164 |
| 5,752,736 A | * | 5/1998 | Nodier | 296/164 |
| 5,988,472 A | * | 11/1999 | McPhail et al. | 296/100.02 |
| 6,299,244 B1 | * | 10/2001 | Tarahomi | 296/210 |
| 6,439,646 B1 | * | 8/2002 | Cornelius | 296/164 |
| 6,505,879 B1 | * | 1/2003 | Arviso | 296/100.16 |

* cited by examiner

*Primary Examiner*—Stephen T. Gordon
*Assistant Examiner*—Greg Blankenship
(74) *Attorney, Agent, or Firm*—Allen, Dyer, Doppelt, Milbrath & Gilchrist, P.A.

(57) ABSTRACT

A canopy top for covering an open cargo area in a motor vehicle comprises a support frame having a plurality of elongated cylindrical support members forming the support frame and forming at least a portion of an outer periphery of said canopy top, a plurality of connectors connecting the plurality of elongated cylindrical support members together to form said support frame, a plurality of flanges, each individual member of the plurality of elongated cylindrical support members having at least one flange of the plurality of flanges extending along a lengthwise dimension of the member, a plurality of panels positioned on said support frame, each individual panel connected to at least two individual flanges of said plurality of flanges; and at least one access point in said canopy top to therethrough access the cargo area of the motor vehicle.

29 Claims, 2 Drawing Sheets

CANOPY TOP FOR VEHICLES

RELATED APPLICATION

This application claims priority under 35 U.S.C. §119 from prior filed foreign application No. MU8102276-0, which was filed in Brazil on Oct. 22, 2001. A certified copy of the priority application is attached hereto. This application also claims priority from and is a continuation-in-part of U.S. application Ser. Nos. 29/129,035 now Des. 468,682 and 29/129,036 now Des. 464, 606 which were filed on Sep. 6, 2000.

FIELD OF THE INVENTION

The present invention relates to the field of canopy tops and, more particularly, to a canopy top having a support frame comprising elongated cylindrical support members which form portions of an outer periphery of the canopy top so that at least some of the elongated cylindrical support members are exposed and visible from the outside of the vehicle. The canopy top is preferably for use with pickup trucks or other motor vehicles having an open cargo area.

BACKGROUND OF THE INVENTION

Canopy tops for motor vehicles having an open cargo area have been known for some time. These motor vehicles are, typically, pickup trucks, but may also include open Jeep-type vehicles, and other utility vehicles, even boats. Most known canopy tops are made with support members which are flat or square in cross section. Such support members are usually not strong enough to resist crushing if the vehicle is involved in an accident. In addition, previously known canopy tops have a support frame which is not exposed and visible from the outside of the vehicle.

SUMMARY OF THE INVENTION

With the foregoing in mind, the present invention advantageously provides a canopy top for a motor vehicle having an open cargo area, the canopy top having a support frame comprising support members having a round cross section and which are preferably tubular support members, which also act as crush resistant roll-bars in the event the vehicle is involved in an accident. In addition, the round or tubular canopy support members of the frame are positioned not only forming the support frame but also forming portions of an outer periphery of the support frame, so that at least some of the plurality of elongated cylindrical support members are visible from the exterior of the motor vehicle. A canopy top having cylindrical support members which are visible from the outside of the vehicle provides a distinctive appearance to the vehicle which is very desirable to the motoring public. Accordingly, the present invention not only provides a canopy top structure which has increased crush resistance, but also provides a distinctive appearance to the vehicle.

BRIEF DESCRIPTION OF THE DRAWINGS

Some of the features, advantages, and benefits of the present invention having been stated, others will become apparent as the description proceeds when taken in conjunction with the accompanying drawings, presented for solely for exemplary purposes and not with intent to limit the invention thereto, and in which.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may, however, be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

Figure 1:
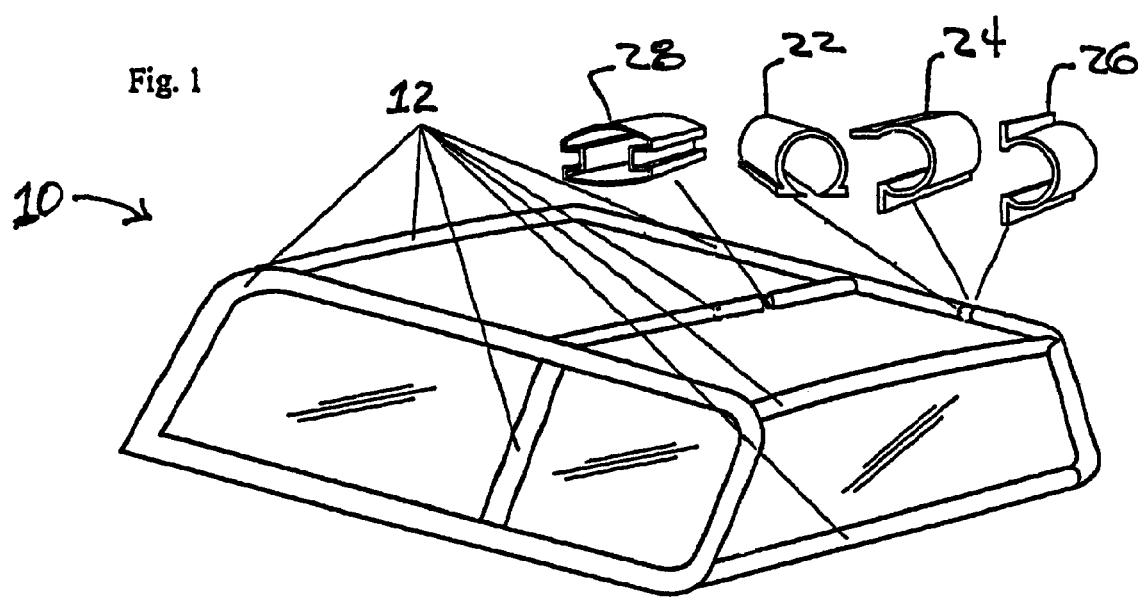
FIG. 1 is a perspective front view illustrating a typical embodiment of the present invention, including various connectors which may be employed in joining together the plurality of elongated cylindrical support members.
Figure 2:
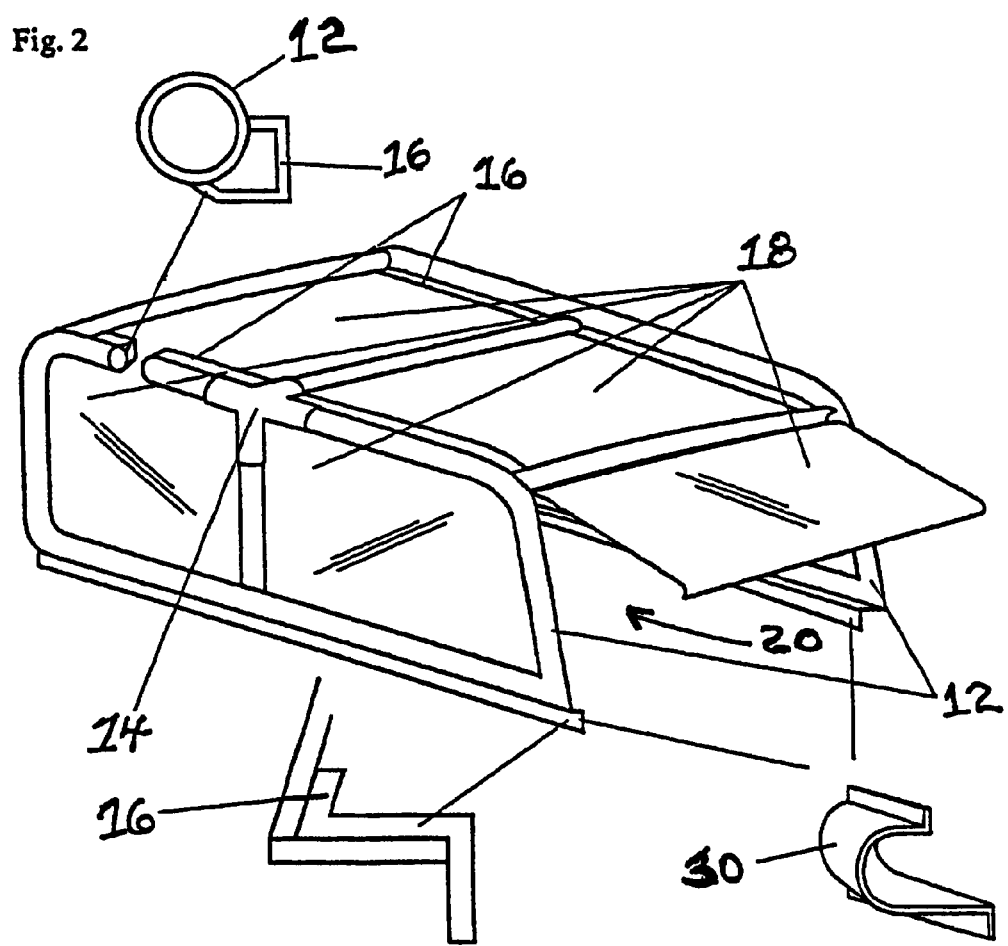
FIG. 2 shows a perspective back view of another embodiment of the invention of FIG. 1.

FIGS. 1 and 2 illustrate a canopy top 10 for covering an open cargo area in a motor vehicle. The canopy top comprises a support frame, a plurality of connectors, a plurality of flanges, a plurality of panels, and at least one access point, for example, a door or window. The support frame has a plurality of elongated cylindrical support members 12 which form the support frame. A plurality of connectors is positioned connecting the plurality of elongated cylindrical support members together to form said support frame. A connector for joining the component members of the canopy top 10 may be selected from a weld, a bond, and a mechanical connector. One type of mechanical connector is shown as element 14 in FIG. 2. A plurality of flanges 16 is positioned so that each individual member of the plurality of elongated cylindrical support members has at least one flange extending along a lengthwise dimension of the member. A plurality of panels 18 is positioned on said support frame, each individual panel being connected to at least two individual flanges 16 of said plurality of flanges. At least one access point 20 is provided in said canopy top to therethrough access the cargo area of the motor vehicle, the access point preferably being a door or a window.

In a preferred embodiment of the canopy topy, the plurality of elongated cylindrical support members comprises hollow tubes, as shown in FIG. 2. Even more preferably, the frame consists of the plurality of elongated cylindrical support members, especially wherein these support members are hollow tubes. The support frame also best includes the plurality of elongated cylindrical support members 12 of the support frame positioned to form portions of an outer periphery of the canopy so that at least some of the plurality of elongated cylindrical support members are visible from the exterior of the motor vehicle.

In alternative embodiments of the invention, the cylindrical support members may be open along a lengthwise dimension, as shown in elements 22, 24, 26 and 30, or may be an elongated oval tubular cylinder having at least one lateral channel extending along a lengthwise dimension to therein receive the edge of a panel, as shown in element 28.

In the canopy top the individual panels are selected from a material comprising glass, plastic, cloth, and metal. For example, the canopies illustrated in FIGS. 1 and 2 have lateral panels made of a transparent material such as glass or plastic. Additionally, one or more panels used in the roof of the canopy may be translucent to allow ambient light to penetrate the canopy and illuminate the vehicle's cargo area thereunder. Panels for use in the canopy invention may be selected from flat panels and curved panels, such a curved panel being shown as the lift gate of the canopy illustrated in FIG. 2.

As best shown in FIG. 2, in the canopy top at least one individual flange 16 of the plurality of flanges extends outwardly from the support member 12 along the lengthwise dimension.

The invention also includes a canopy top as described, in combination with a motor vehicle having an open cargo area defined by a floor and a plurality of walls extending upwardly from the floor, wherein the canopy top is connected to at least two individual walls of the plurality of walls so as to provide a protective cover over the cargo area. The motor vehicle preferably comprises a pickup truck.

Figure 3:
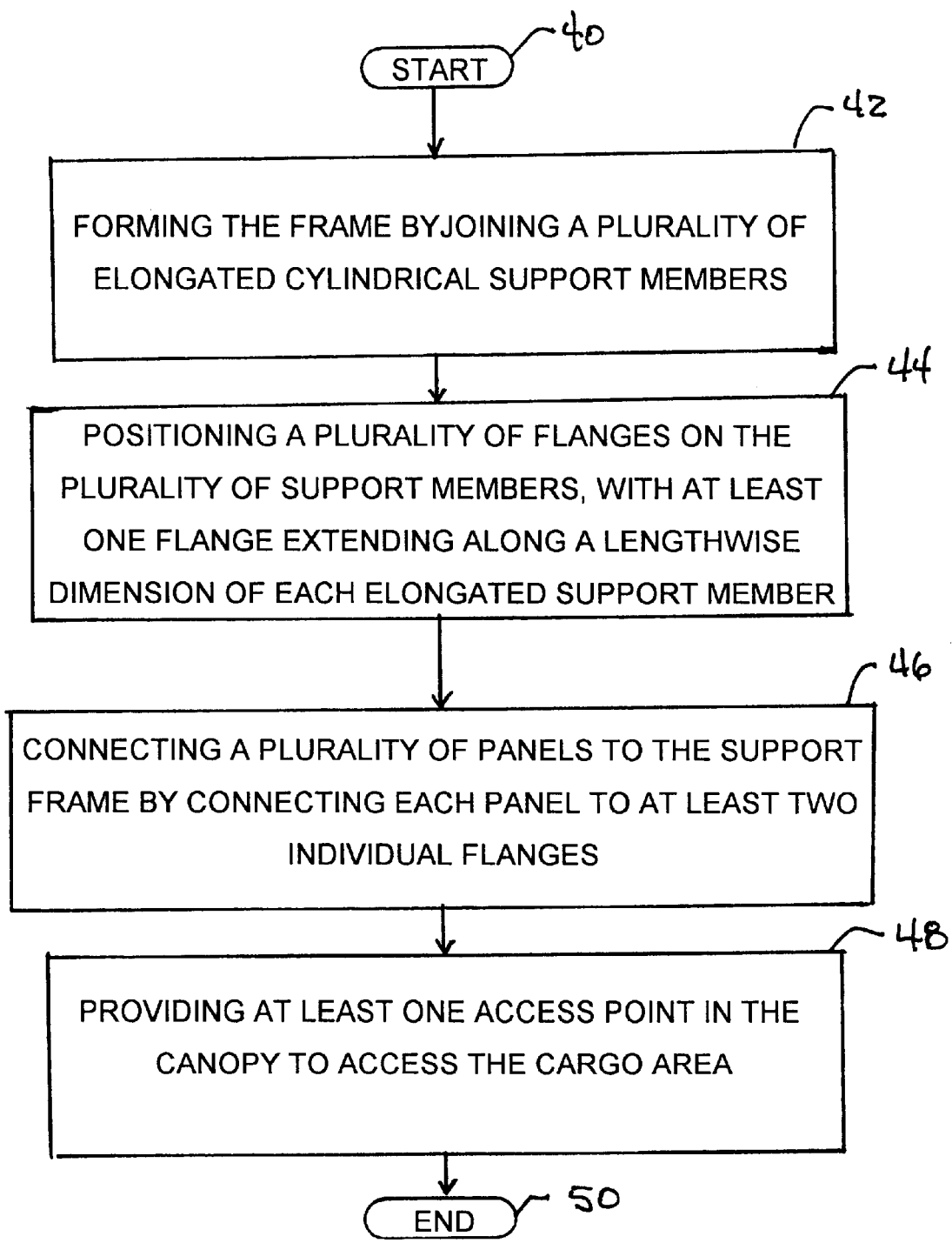
FIG. 3 shows a block diagram of the method of the invention of FIG. 1.

A method aspect of the invention includes a method of making a canopy top for covering an open cargo area in a motor vehicle, as shown diagrammatically in FIG. 3. The method preferably starts 40 by joining to each other a plurality of elongated cylindrical support members with a plurality of connectors, each individual cylindrical member of the plurality positioned so as to form 42 a canopy top support frame and to form at least a portion of an outer periphery of the canopy top. A plurality of flanges is positioned 44 on the plurality of elongated cylindrical support members, wherein at least one flange extends along a lengthwise dimension of each individual elongated cylindrical member of the plurality. A plurality of panels is connected 46 to the canopy top support frame by connecting each individual panel to at least two individual flanges of the plurality of flanges. The method further includes providing 48 at least one access point in the canopy top to therethrough access the cargo area of the motor vehicle, preferably a door or window in the canopy top. Thereafter, the method ends 50.

In the method of the invention, the plurality of elongated cylindrical support members preferably comprises hollow tubes. Additionally, each individual panel of the plurality of panels is selected from a material comprising glass, plastic, cloth, and metal, and the panels may be selected from flat panels and curved panels. Connecting, in the invention, includes using welds, and mechanical connectors, as known in the art. Further, at least one individual flange of the plurality of flanges preferably extends radially along the lengthwise extent, although the flange could also extend tangentially along the lengthwise extent of the support member.

The method additionally includes connecting the canopy top in combination with a motor vehicle having an open cargo area defined by a floor and a plurality of walls extending upwardly from the floor, wherein the canopy top is connected to at least two individual walls of the plurality of walls so as to provide a protective cover over the cargo area. In the method the preferred motor vehicle is a pickup truck, however, those skilled in the art will recognize that the present canopy top invention may be adaptable to any vehicle having an open cargo area which may be advantageously covered.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A canopy top for covering an open cargo area in a motor vehicle, said canopy top comprising:
    a support frame having a plurality of elongated cylindrical support members forming the support frame and forming at least a portion of an outer periphery of said canopy top;
    a plurality of flanges, each individual member of the plurality of elongated cylindrical support members having at least one flange of the plurality of flanges extending along a lengthwise dimension of the member;
    a plurality of panels positioned on said support frame, each individual panel connected to at least two individual flanges of said plurality of flanges;
    a plurality of connectors connecting the plurality of elongated cylindrical support members, plurality of flanges, and plurality of panels together to form said canopy top; and
    at least one access point in said canopy top to therethrough access the cargo area of the motor vehicle.

2. The canopy of claim 1, wherein said plurality of elongated cylindrical support members comprises hollow tubes.

3. The canopy top of claim 1, wherein each individual panel of said plurality of panels is selected from a material comprising glass, plastic, cloth, and metal.

4. The canopy top of claim 1, wherein said plurality of panels comprises individual panels selected from flat panels and curved panels.

5. The canopy top of claim 1, wherein said plurality of panels comprises at least one curved panel.

6. The canopy top of claim 1, wherein each individual connector of the plurality of connectors is selected from a weld, and a mechanical connector.

7. The canopy top of claim 1, wherein at least one individual flange of the plurality of flanges extends radially along the lengthwise dimension.

8. The canopy top of claim 1, wherein at least one individual flange of said plurality of flanges extends tangentially along the lengthwise dimension.

9. The canopy top of claim 1 in combination with a motor vehicle having an open cargo area defined by a floor and a plurality of walls extending upwardly from the floor, and the canopy top is connected to at least two individual walls of the plurality of walls so as to provide a protective cover over the cargo area.

10. The combination of claim 9, wherein the motor vehicle comprises a pickup truck.

11. A canopy top for covering an open cargo area in a motor vehicle, said canopy top comprising:
    a support frame consisting of a plurality of elongated tubular support members forming the support frame and forming at least a portion of an outer periphery of said canopy top;

a plurality of flanges, each individual member of the plurality of tubular members having at least one flange of the plurality of flanges extending along a lengthwise dimension of the member;

a plurality of panels positioned on said support frame, each individual panel connected to at least two individual flanges of said plurality of flanges;

a plurality of connectors connecting the plurality of elongated tubular support members, plurality of flanges, and plurality of panels together to form said canopy top; and at least one access point in said canopy top to therethrough access the cargo area of the motor vehicle.

12. The canopy top of claim 11, wherein each individual panel of said plurality of panels is selected from a material comprising glass, plastic, cloth, and metal.

13. The canopy top of claim 11, wherein said plurality of panels comprises individual panels selected from flat panels and curved panels.

14. The canopy top of claim 11, wherein said plurality of panels comprises at least one curved panel.

15. The canopy top of claim 11, wherein each individual connector of the plurality of connectors is selected from a weld, and a mechanical connector.

16. The canopy top of claim 11, wherein at least one individual flange of the plurality of flanges extends radially along the lengthwise dimension.

17. The canopy top of claim 11, wherein at least one individual flange of said plurality of flanges extends tangentially along the lengthwise dimension.

18. The canopy top of claim 11, in combination with a motor vehicle having an open cargo area defined by a floor and a plurality of walls extending upwardly from the floor, and the canopy top is connected to at least two individual walls of the plurality of walls so as to provide a protective cover over the cargo area.

19. The combination of claim 18, wherein the motor vehicle comprises a pickup truck.

20. A method of making a canopy top for covering an open cargo area in a motor vehicle, the method comprising:

joining to each other a plurality of elongated cylindrical support members with a plurality of connectors, each individual cylindrical member of the plurality positioned so as to form a canopy top support frame and to form at least a portion of an outer periphery of the canopy top;

positioning a plurality of flanges on the plurality of elongated cylindrical support members, wherein at least one flange extends along a lengthwise dimension of each individual elongated cylindrical member of the plurality;

connecting a plurality of panels to the canopy top support frame by connecting each individual panel to at least two individual flanges of the plurality of flanges; and providing at least one access point in the canopy top to therethrough access the cargo area of the motor vehicle.

21. The method of claim 20, wherein said plurality of elongated cylindrical support members comprises hollow tubes.

22. The method of claim 20, wherein each individual panel of the plurality of panels is selected from a material comprising glass, plastic, cloth, and metal.

23. The method of claim 20, wherein the plurality of panels comprises individual panels selected from flat panels and curved panels.

24. The method to of claim 20, wherein the plurality of panels comprises at least one curved panel.

25. The method of claim 20, wherein each individual connector of the plurality of connectors is selected from a weld, and a mechanical connector.

26. The method of claim 20, wherein at least one individual flange of the plurality of flanges extends radially along the lengthwise extent.

27. The method of claim 20, wherein at least one individual flange of said plurality of flanges extends tangentially along the lengthwise extent.

28. The method of claim 20, further comprising connecting the canopy top to a motor vehicle having an open cargo area defined by a floor and a plurality of walls extending upwardly from the floor, and the canopy top is connected to at least two individual walls of the plurality of walls so as to provide a protective cover over the cargo area.

29. The method of claim 28, wherein the motor vehicle comprises a pickup truck.

* * * * *